(12) United States Patent
Hamidi et al.

(10) Patent No.: US 8,804,270 B2
(45) Date of Patent: Aug. 12, 2014

(54) TAPE HEAD ACTUATOR

(75) Inventors: Hoodin Hamidi, Pleasant Hill, CA (US); Philipp Herget, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 482 days.

(21) Appl. No.: 13/026,142

(22) Filed: Feb. 11, 2011

(65) Prior Publication Data

US 2012/0206832 A1    Aug. 16, 2012

(51) Int. Cl.
*G11B 21/02*    (2006.01)

(52) U.S. Cl.
USPC .......................................................... 360/75

(58) Field of Classification Search
None
See application file for complete search history.

(56) References Cited

U.S. PATENT DOCUMENTS

| | | | |
|---|---|---|---|
| 5,021,906 A | 6/1991 | Chang et al. | |
| 5,636,088 A | 6/1997 | Yamamoto et al. | |
| 5,982,592 A * | 11/1999 | Saito et al. | 360/130.31 |
| 6,222,698 B1 | 4/2001 | Barndt et al. | |
| 6,246,552 B1 | 6/2001 | Soeno et al. | |
| 6,611,399 B1 | 8/2003 | Mei et al. | |
| 6,757,128 B2 | 6/2004 | Yip | |
| 7,068,473 B2 | 6/2006 | O'Neill | |
| 7,239,465 B1 | 7/2007 | Watson et al. | |
| 7,301,724 B2 | 11/2007 | Brittenham | |
| 7,342,738 B1 | 3/2008 | Anderson et al. | |
| 7,393,066 B2 | 7/2008 | Dugas et al. | |
| 7,474,495 B2 | 1/2009 | Weng et al. | |
| 7,486,464 B2 | 2/2009 | Saliba | |
| 7,505,221 B2 | 3/2009 | Watson | |
| 7,529,060 B2 | 5/2009 | Simmons, Jr. et al. | |
| 7,738,212 B2 | 6/2010 | Saliba et al. | |
| 7,764,460 B2 | 7/2010 | Bates et al. | |
| 8,184,394 B2 | 5/2012 | Poorman et al. | |
| 8,310,778 B2 | 11/2012 | Biskeborn et al. | |
| 2010/0067139 A1 | 3/2010 | Bates et al. | |

FOREIGN PATENT DOCUMENTS

WO        2010/044784 A1        4/2010

OTHER PUBLICATIONS

U.S. Appl. No. 13/010,731, filed Jan. 20, 2011.
Non-Final Office Action from U.S. Appl. No. 13/010,731 dated Mar. 6, 2013.
Final Office Action from U.S. Appl. No. 13/010,731 dated Aug. 8, 2013.
Biskeborn et al., U.S. Appl. No. 13/010,731, filed Jan. 20, 2011.
Notice of Allowance and Fee(s) Due from U.S. Appl. No. 13/010,731 dated Feb. 28, 2014.

* cited by examiner

*Primary Examiner* — K. Wong
(74) *Attorney, Agent, or Firm* — Zilka-Kotab, PC

(57) ABSTRACT

An assembly according to one embodiment includes a first module and a second module each having multiple transducers, wherein the first module is movable relative to the second module; a tape dimensional stability compensation mechanism for tilting the modules to control a transducer pitch presented to a tape; and an actuator adapted to exert a force on both modules for causing the relative movement of the first module with respect to the second module for aligning the transducers of the first module with the transducers of the second module in a direction of tape travel thereacross.

20 Claims, 11 Drawing Sheets

TAPE HEAD ACTUATOR

BACKGROUND

The present invention relates to data storage systems, and more particularly, this invention relates to a tape-based data storage system having an actuator for tape dimensional stability compensation.

Business, science and entertainment applications depend upon computing systems to process and record data. In these applications, large volumes of data are often stored or transferred to nonvolatile storage media, such as magnetic discs, magnetic tape cartridges, optical disk cartridges, floppy diskettes, or floptical diskettes. Typically, magnetic tape is the most economical, and secure means of storing or archiving data.

Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is currently measured in hundreds of gigabytes.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. AMR and GMR sensors offer signal levels higher than those available from conventional inductive read heads for a given read sensor width and so enable smaller reader widths and thus more tracks per inch, and thus higher data storage density. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

The quantity of data stored on a magnetic tape may be increased by increasing the number of data tracks across the tape. More tracks are made possible by reducing feature sizes of the readers and writers, such as by using thin-film fabrication techniques and MR sensors. However, the feature sizes of readers and writers cannot be arbitrarily reduced. Factors such as lateral tape motion transients and tape lateral expansion and contraction must be balanced with reader/writer sizes that provide acceptable written tracks and readback signals. One issue limiting areal density is misregistration caused by tape lateral expansion and contraction. Tape width can vary by up to about 0.1% due to expansion and contraction caused by changes in humidity, tape tension, temperature, etc. This is often referred to as tape dimensional stability (TDS).

If the tape is written in one environment and then read back in another, the TDS will prevent the spacing of the tracks on the tape from precisely matching the spacing of the elements during readback. In current products, the change in track spacing due to TDS is small compared to the size of the written tracks and is part of the tracking budget that is considered when designing a product. As the tape capacity increases over time, tracks will become smaller and TDS will become increasingly significant.

SUMMARY

An assembly according to one embodiment includes a first module and a second module each having multiple transducers, wherein the first module is movable relative to the second module; a tape dimensional stability compensation mechanism for tilting the modules to control a transducer pitch presented to a tape; and an actuator adapted to exert a force on both modules for causing the relative movement of the first module with respect to the second module for aligning the transducers of the first module with the transducers of the second module in a direction of tape travel thereacross.

A system according to one embodiment includes opposing modules generally aligned with each other in a direction of tape travel thereacross, positions of the two modules being fixed relative to each other in every direction of movement except one, each module having multiple transducers arranged in an array; and an actuator adapted to exert a force on both modules for causing a relative movement of the modules in the one direction of movement.

A method according to one embodiment includes determining a desired pitch for transducers for reading and/or writing to a magnetic tape; tilting a head to achieve the desired pitch, the head having opposing modules generally aligned with each other in a direction of tape travel thereacross, positions of the two modules being fixed relative to each other in every direction of movement except one, each module having an array of the transducers; and changing a state of an actuator for causing a relative movement of the modules in the one direction of movement for aligning the transducers of the modules in the direction of tape travel thereacross.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, an assembly includes a first module and a second module each having multiple transducers, wherein the first module is movable relative to the second module; a tape dimensional stability compensation mechanism for tilting the modules to control a transducer pitch presented to a tape; and an actuator adapted to exert a force on both modules for causing the relative movement of the first module with respect to the second module for aligning the transducers of the first module with the transducers of the second module in a direction of tape travel thereacross.

In one general embodiment, a system includes opposing modules generally aligned with each other in a direction of tape travel thereacross, positions of the two modules being fixed relative to each other in every direction of movement except one, each module having multiple transducers arranged in an array; and an actuator adapted to exert a force on both modules for causing a relative movement of the modules in the one direction of movement.

In one general embodiment, a method includes determining a desired pitch for transducers for reading and/or writing to a magnetic tape; tilting a head to achieve the desired pitch, the head having opposing modules generally aligned with each other in a direction of tape travel thereacross, positions of the two modules being fixed relative to each other in every direction of movement except one, each module having an array of the transducers; and changing a state of an actuator for causing a relative movement of the modules in the one direction of movement for aligning the transducers of the modules in the direction of tape travel thereacross.

Figure 1:
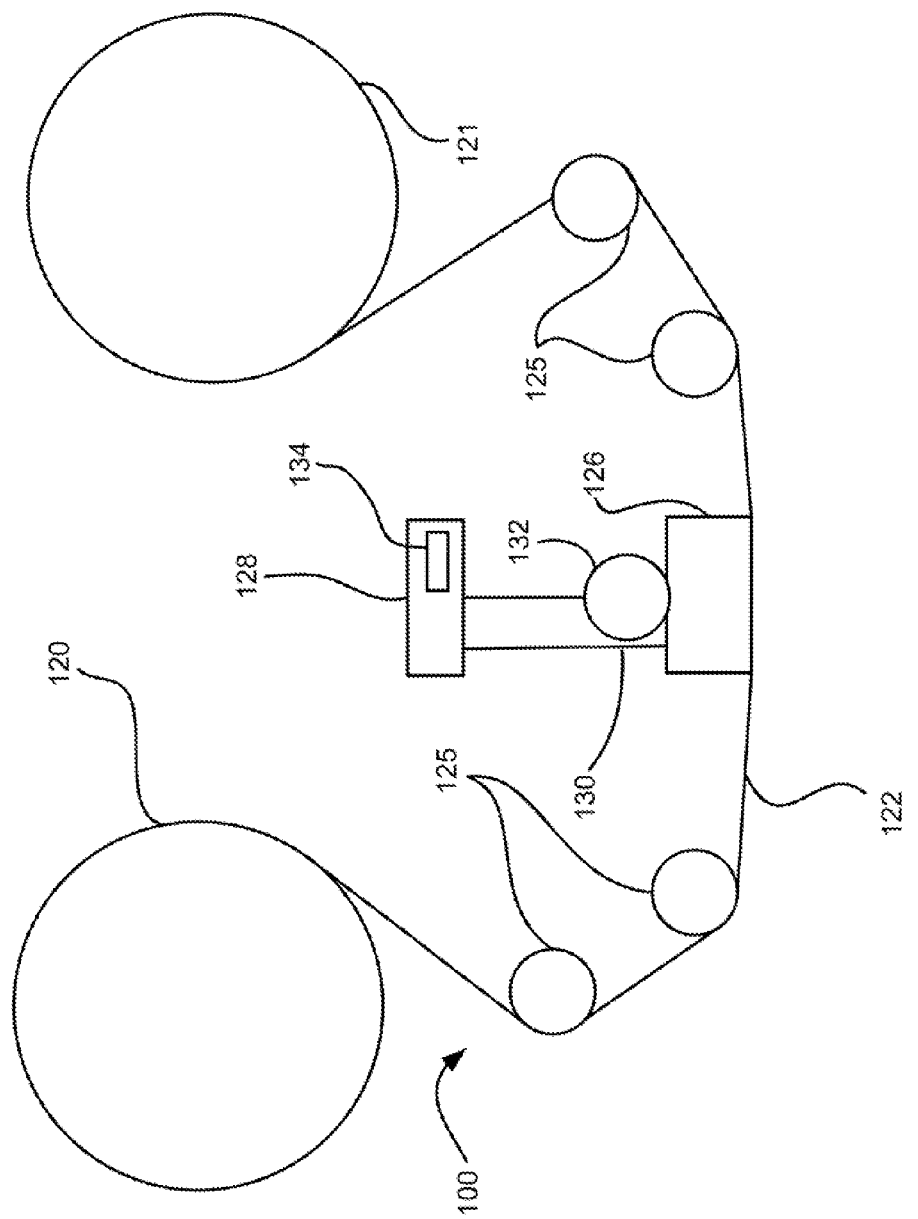
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
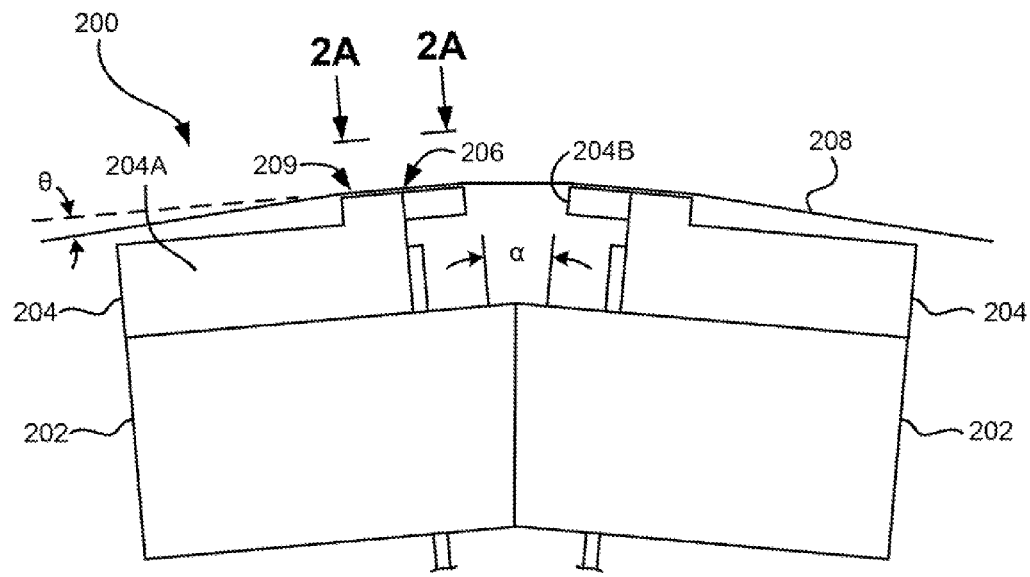
FIG. 2 illustrates a side view of a flat-lapped, bi-directional, two-module magnetic tape head.

By way of example of operation of a tape drive, FIG. 2 illustrates a side view of a flat-lapped, bi-directional, two-module magnetic tape head 200 which is provided for explanatory purposes to show general principles of a tape-based data storage system. Note that in various embodiments of the present invention, other configurations may be used, which themselves may include components similar to and/or different than those shown in FIG. 2, as will become apparent to one skilled in the art upon reading the present specification and viewing the appended drawings. As shown, the head includes a pair of modules, each comprised of a base 202, bonded to a chiplet 204. Each chiplet 204 includes a substrate 204A and a closure 204B with a thin film portion, commonly referred to as a "gap" in which the readers and/or writers 206 are formed. The bases are typically "U-beams" which provide space for a cable in the center and allow adhesive bonding near the edges of the U. The U-Beam bases are bonded together at a small angle α with respect to each other. After bonding the two modules form a single physical unit to provide read-while-write capability by activating the writer of the leading module and reader of the trailing module aligned with the writer of the leading module parallel to the direction of tape travel relative thereto. In use, a tape 208 is moved over the chiplets 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

In generally, the readers on one module are aligned with the writers on the opposite module, such that a data patterns written by one module can subsequently be read by the second module as the tape moves thereacross. The readers and writers in one module may be arranged in a piggyback configuration. The readers and writers may also be arranged in an interleaved configuration. Alternatively, each array of channels may be readers or writers only. Any of these arrays may contain one or more servo readers.

Figure 2A:
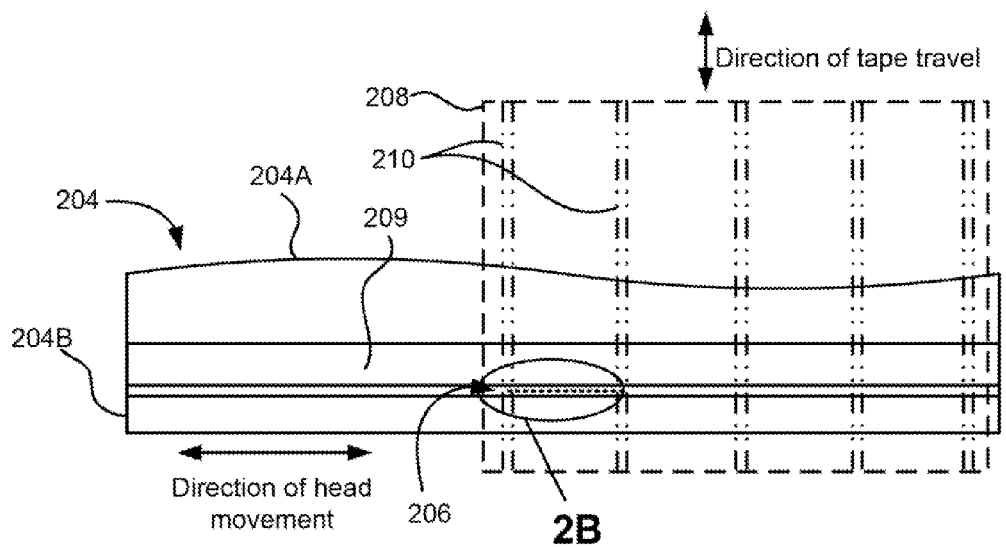
FIG. 2A is a tape bearing surface view taken from Line 2A of FIG. 2.

FIG. 2A illustrates the tape bearing surface 209 of one of the chiplets 204 taken from Line 2A of FIG. 2. A representative tape 208 is shown in dashed lines. The chiplet 204 is preferably long enough to be able to support the tape as the head steps between data bands.

In this example, the tape 208 includes 4 data bands, e.g., with 4 data bands and 5 servo tracks 210, as shown in FIG. 2A on a one-half inch wide tape 208. The data bands are defined between servo tracks 210. Each data band may include a number of data tracks, for example 96 data tracks (not shown). During read/write operations, the readers and/or writers 206 are positioned within one of the data bands. Outer readers, sometimes called servo readers, read the servo tracks 210. The servo signals are in turn used to keep the readers and/or writers 206 aligned with a particular track during the read/write operations.

Figure 2B:
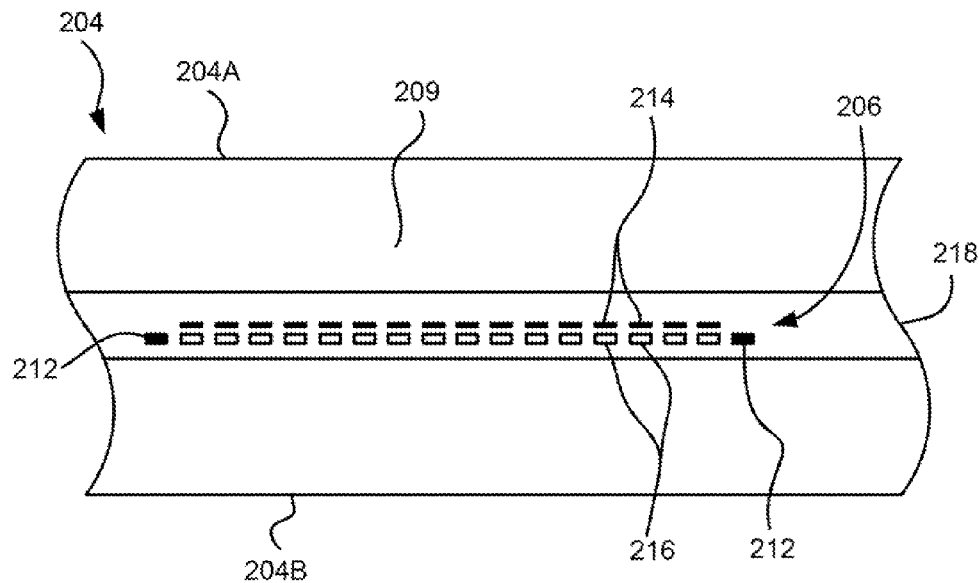
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
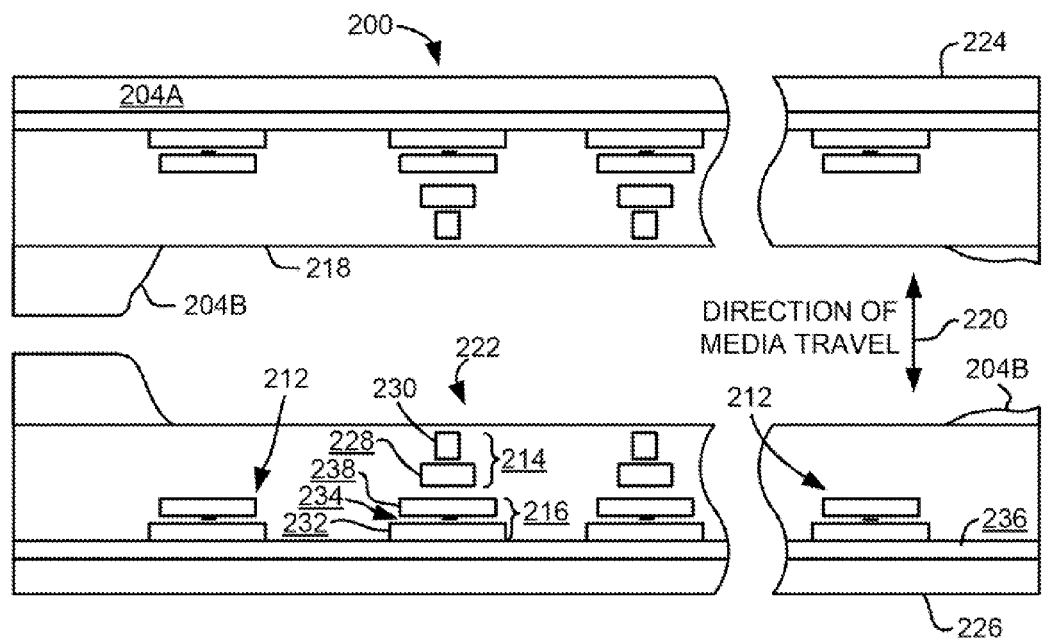
FIG. 2C is a detailed view of a partial tape bearing surface of a pair of modules.

FIG. 2C shows a partial tape bearing surface view of complimentary modules of a magnetic tape head 200. Each module has a plurality of read/write (R/W) transducer pairs in a piggyback configuration formed on a common substrate 204A and an optional electrically insulative layer 236. The writers on one module, exemplified by the write head 214 and the readers on the opposite module, exemplified by the read head 216, are aligned across from each other such that they are parallel to a direction of travel of a tape medium thereacross to form an R/W pair, exemplified by the R/W pair 222. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 in this example includes two thin-film modules 224 and 226 of generally identical construction.

When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

As noted above, tape lateral expansion and contraction presents many challenges to increasing data track density on tape. In an ideal situation, the tape drive system would always be able to write tracks onto the tape in the proper position based on the servo signals derived from the tape, regardless of the extent of tape lateral expansion or contraction at any given time.

Figure 3A:
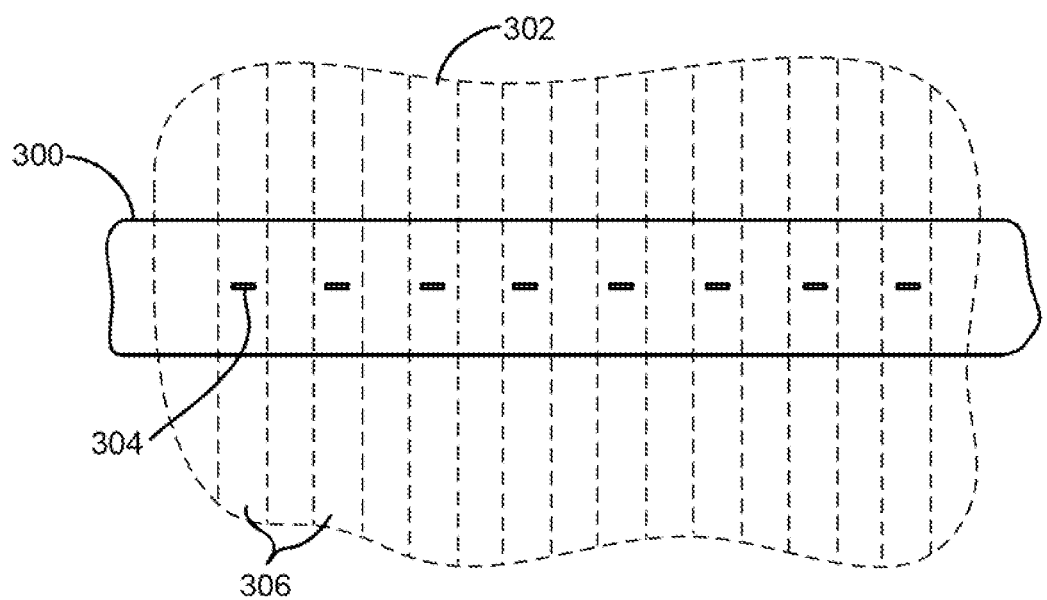
FIGS. 3A-3C are representative drawings showing the effect of tape lateral expansion and contraction on reader position relative thereto.
Figure 3B:
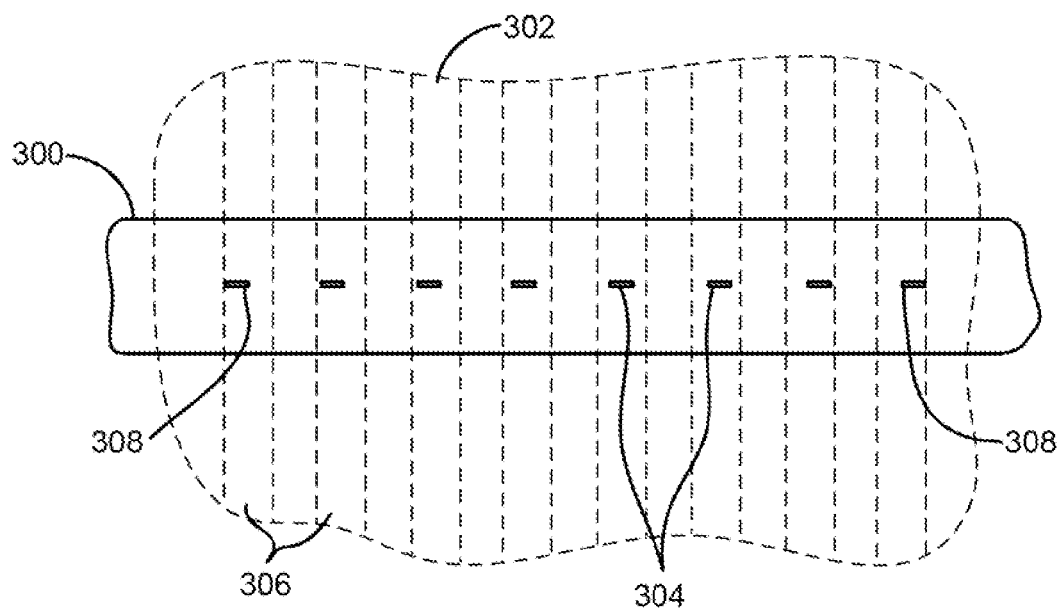
Figure 3C:
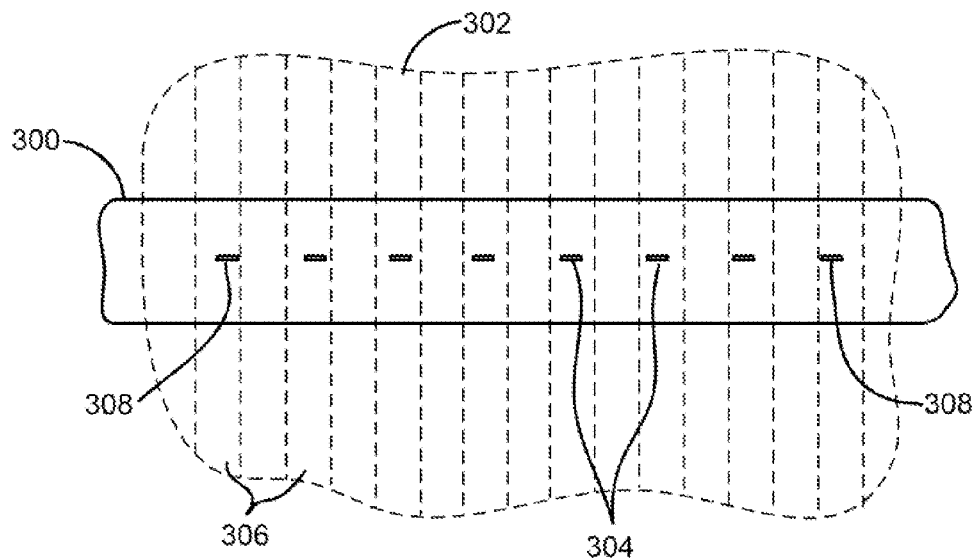

FIGS. 3A-3C represent the effect of tape lateral expansion and contraction on reader position relative thereto. FIG. 3A shows a head 300 relative to the tape 302, where the tape has a nominal width. As shown, the readers 304 are aligned with the data tracks 306 on the tape 302. FIG. 3B shows the effect of tape lateral contraction. As shown, the outermost readers 308 are positioned along the outer edges of the outer data tracks. FIG. 3C shows the effect of tape lateral expansion. As shown, the outermost readers 308 are positioned along the inner edges of the outer data tracks. Because all of the readers 304 have the same width, the readback signal level from each reader will normally be the same.

Figure 4A:
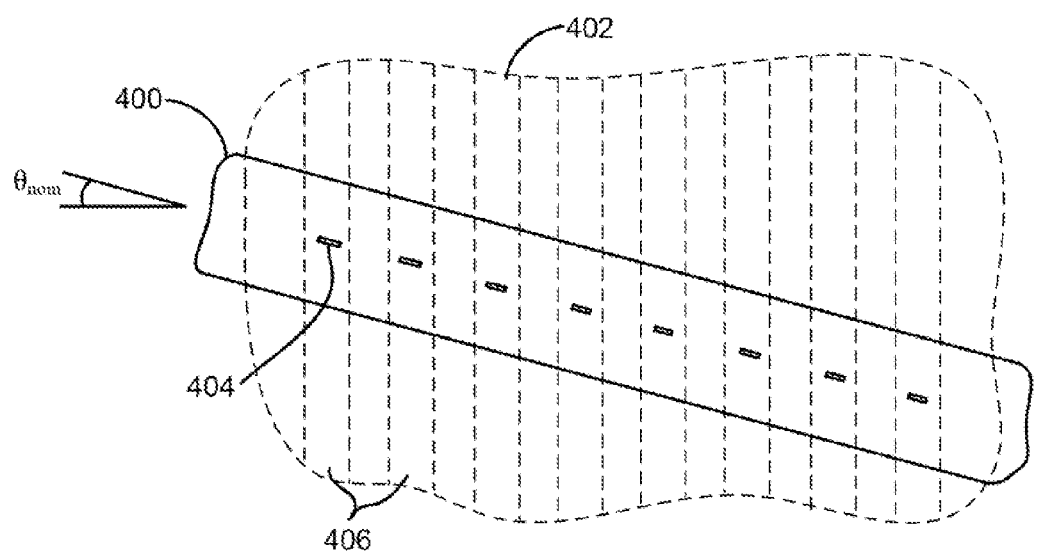
FIGS. 4A-4C are representative drawings illustrating rotation of a magnetic tape head to compensate for the effect of tape lateral expansion and contraction.
Figure 4B:
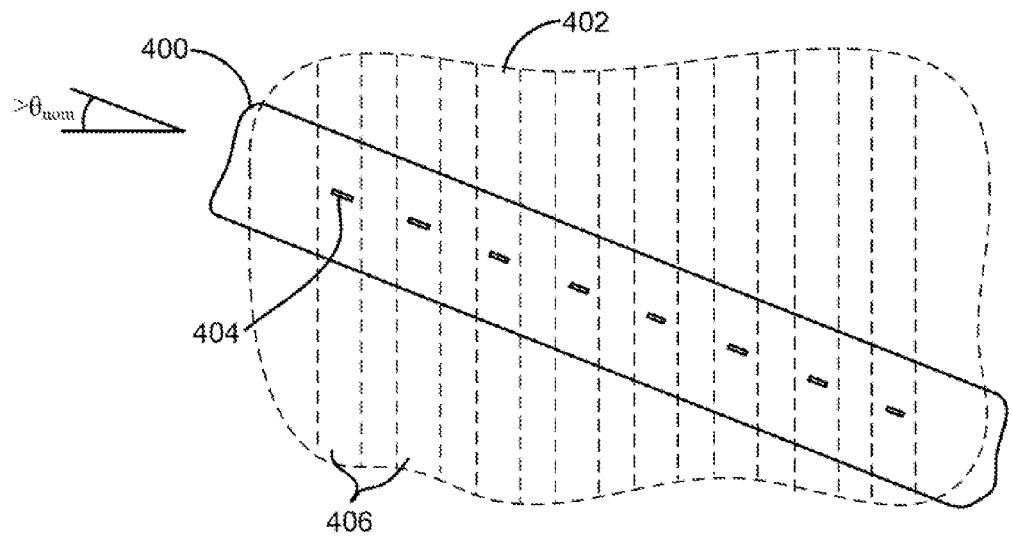
Figure 4C:
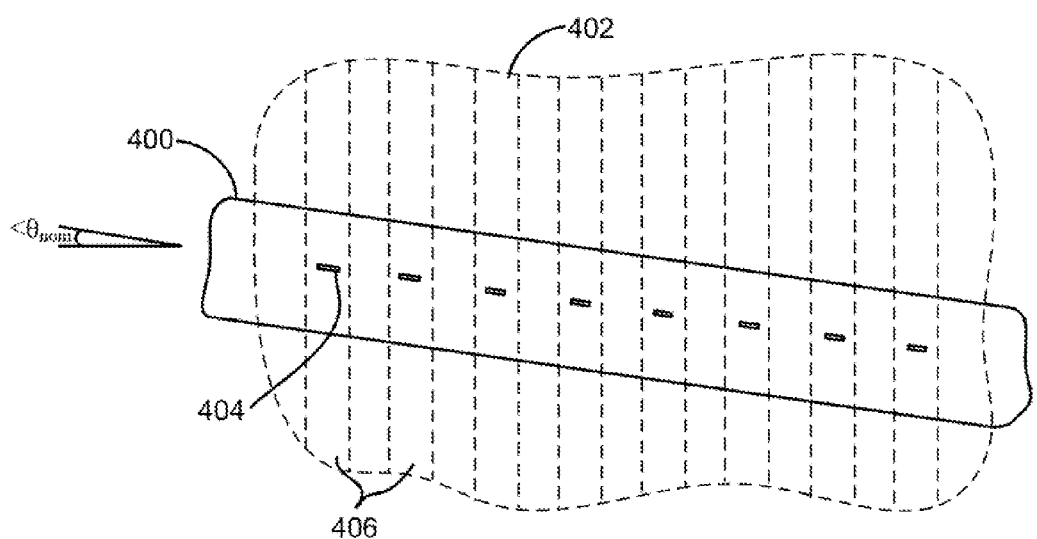

In various embodiments, the foregoing is achieved by pivoting the head, thereby selectively altering the pitch of the transducers in the array. In one approach to compensate for tape lateral expansion and contraction, the head is azimuthly rotated to a static nominal angle. Smaller angular adjustments may be made to keep the project reader span aligned with tracks on the tape. This solution is represented in exaggerated form for a single module in FIGS. 4A-4C. FIG. 4A shows the head 400 relative to the tape 402, where the tape has a nominal width. As shown, the readers 404 are aligned with the data tracks 406 on the tape 402 and the head is rotated by an angle $\theta_{nom}$. FIG. 4B shows the head 400 rotated by an angle greater than $\theta_{nom}$ to compensate for tape lateral contraction. FIG. 4C shows the head 400 rotated by an angle less than $\theta_{nom}$ to compensate for tape lateral expansion.

The foregoing tilting method works well when only one module is used (one row of elements). However, magnetic tape systems generally have two or more modules, each containing a row of transducers, where the additional rows of transducers allow for read verify during the write process. One difficulty in implementing this scheme in a head having multiple arrays, such as for the head in FIGS. 2 and 2C, is that though one array of transducers may be properly aligned with the tracks, the static rotation causes skew-related misregistration of the opposing array. In other words, when the tilt angle of a rigid head is changed, it is impossible to keep all elements on track since the other rows of elements will move relative to the first row.

The present disclosure describes several embodiments that implement an actuator, that creates relative motion between modules and enables tilt compensation for TDS on a multi-module head. Various embodiments include the actuator and a TDS compensation mechanism for tilting the modules to control a transducer pitch presented to the tape. Any known mechanism suitable for tilting the modules may be used. Alternatively, the angle of the head may be kept fixed relative to the drive, and the angle of the tape may be changed. In this case, any known mechanism for changing the angle at which the tape runs across the head may be used. Illustrative TDS compensation mechanisms include worm screws, voice coil actuators, thermal actuators, piezoelectric actuators, etc. A controller in one approach is configured to control the TDS compensation mechanism and the actuator based on a readback signal of the tape, e.g., servo signals, data signals, a combination of both, etc.

By providing a system that compensates for TDS as well as tilt-induced misregistration of a complementary module, various embodiments enable use of wider readers, resulting in a better signal to noise ratio (SNR), and/or smaller data tracks, resulting in a higher capacity per unit area of the media.

Figure 5A:
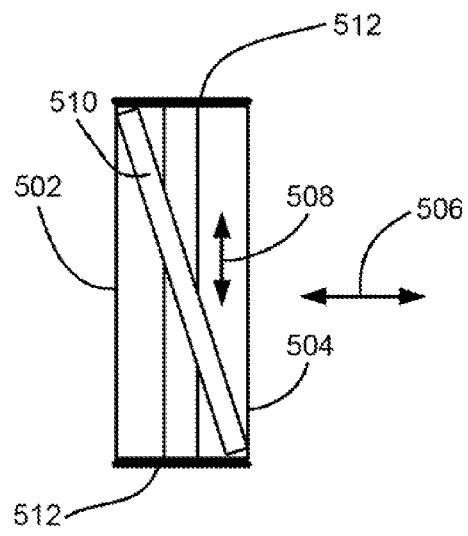
FIGS. 5A-5D are representative drawings illustrating actuation and tilting of modules of a magnetic tape head according to one embodiment.
Figure 5B:
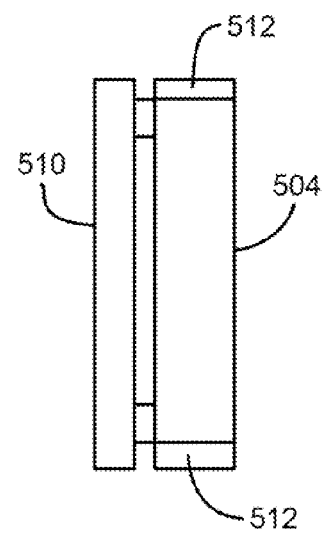

FIGS. 5A and 58 depict bottom and side views, respectively of a conceptual model according to one embodiment. As shown, opposing modules 502, 504 are generally aligned with each other in a direction of tape travel thereacross (arrow 506). Positions of the two modules are fixed relative to each other in every direction of movement except one direction, referred to herein as the allowed direction (arrow 508), each module having multiple transducers arranged in an array. The allowed direction of movement is about perpendicular to the direction of tape travel. The "about" perpendicular is meant to encompass cases such as where the arrays of the modules are tilted from 90° from the direction of tape travel 506 and the allowed direction of movement 508 of the modules is about parallel to a line extending along the transducer arrays.

An actuator 510 causes a relative movement of the modules in the allowed direction of movement by exerting a force on both modules. The actuator is coupled to the two at or near opposite and alternate ends of the modules, e.g., via an adhesive, pins, solder, etc. Placing the coupling closer to the end will allow for the greatest amount of motion using a thermal actuator. To hold the modules in the desired position while allowing this motion, the modules may be connected to one another by a spring 512 or other component that allows flexing in the direction of motion. Note that the allowed direction of movement may be straight, or have a slight arc, depending on the particular design adopted for a given embodiment.

Figure 5C:
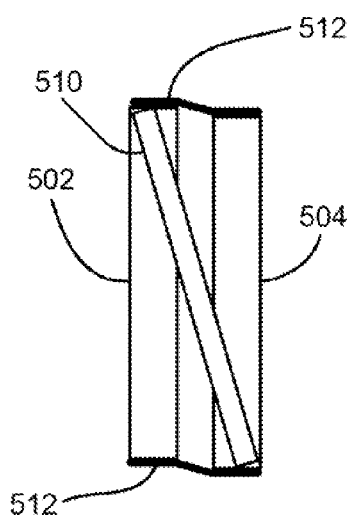
Figure 5D:
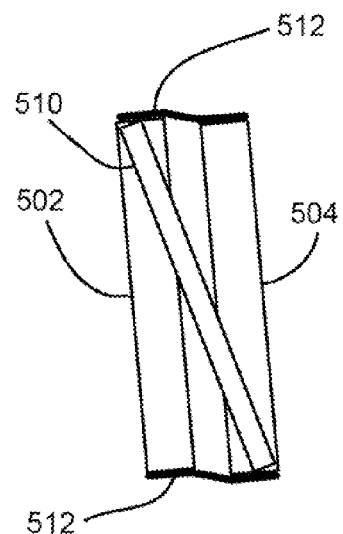

In one approach, the actuator comprises a preferably rigid body, e.g., a beam, coupled to opposite ends of two modules. The beam may be constructed of aluminum or other material with a coefficient of thermal expansion suitable for generating the desired expansion and/or contraction thereof. The temperature of all or a portion of the actuator may be adjusted to induce the expansion and/or contraction thereof. The beam may be heated via any suitable mechanism, including resistive (Joule) heating of the beam itself or of a heating element 306 coupled thereto, raising of an ambient temperature, inductive heating, laser-induced heating, etc., The beam may be cooled via any suitable mechanism, including by a Peltier device, by reducing or terminating application of heat thereto, etc. When the beam is heated, the thermal expansion creates a force that displaces one module with respect to the other, and flexes the springs, as shown in the bottom view of FIG. 5C. FIG. 5D illustrates how the displacement of FIG. 5C, coupled with tilting as in FIG. 5D, results in aligned transducers. Note that a second actuator of any type known in the art may be provided to tilt the assembly to achieve the desired pitch of the transducers in a direction perpendicular to a direction of tape travel across the assembly. The extent of the relative movement needed to align the modules may be dependent upon a degree of tilting.

In an alternative embodiment, the actuator may be made of piezoelectric material such as PZT, or comprise multiple cells of piezoelectric material. In this case, a voltage is applied to the actuator to create relative motion between the modules. In general, and actuator know in the art can be used, such as shape memory alloys, bi-metallic strips, piezoelectric materials, etc.

Figure 6A:
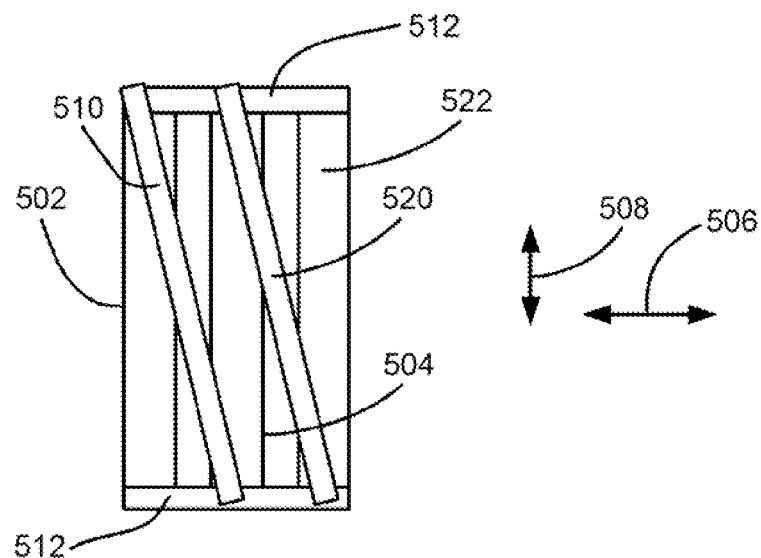
FIGS. 6A-6C are representative drawings of modules and an actuator according to one embodiment.
Figure 6B:
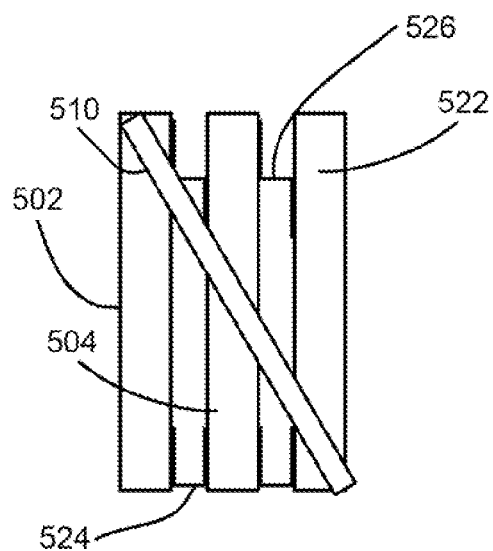
Figure 6C:
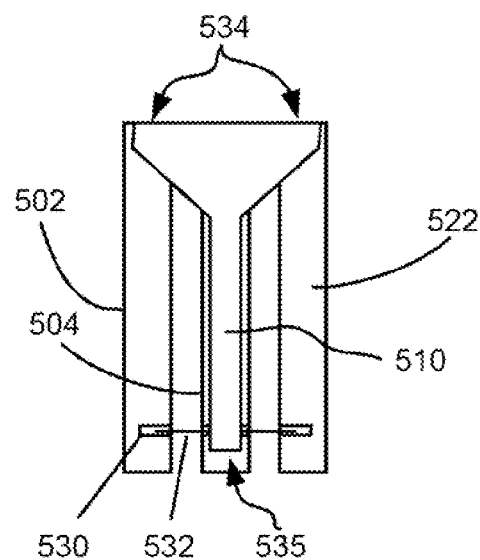

In another embodiment, a similar actuator concept may be applied to a three module head, as shown in FIGS. 6A, 6B, and 6C. Referring to FIG. 6A, actuation can be accomplished by using two preferably rigid beams 510, 520 each affixed to two adjacent modules 502 and 504, 504 and 522, respectively. This configuration includes an additional beam and heater, and performs similarly to the earlier two module embodiment.

Referring to FIG. 6B, actuation can also be accomplished by coupling one preferably rigid beam 510 to the end, center, and opposite end of the three modules 502, 504, 522 respectively. In an alternate embodiment, the actuator 510 may only be coupled to opposite ends of the outer modules 502, 522. This embodiment only includes one beam and one heater, but also only offers half the displacement for a given temperature, compared to the embodiment in FIG. 6A. FIG. 6B also depicts alternate shapes of the component coupling the modules together. Spring 524 is C-shaped, while spring 526 is Z-shaped, where the surfaces of the spring that are parallel to the modules are fixed to the modules.

Referring to FIG. 6C, actuation can also be accomplished using one preferably rigid beam 510 that is attached to the modules at different locations. In FIG. 6C, the beam is attached to the modules at location located at one end 534 of the outer modules 502, 522, and at the opposite end 535 of the inner module 504. In this configuration, the two outer beams move in the same direction relative to the inner beam when the actuator is activated. This embodiment requires only one beam and heater, and provides about the same displacement as the embodiment depicted in FIG. 6A. However, for a typical configuration of three modules of Writer-Reader-Writer or Reader-Writer-Reader, the head must be rotated into a different position whenever the tape direction is reversed.

The embodiment in FIG. 6C, also shows yet another alternative design for attaching the modules via springs. In this embodiment, the modules may have slots 530 in them and a spring 532 is formed by gluing a preferably metal sheet between the modules and into the two opposing slots. This is yet another example of the many types of springs that could be used for any of these embodiments. In general, any type of springs may be used, as long as it is softer in the direction of intended motion and stiffer in the other directions. Many possibilities exist, as will become apparent to one skilled in the art upon reading the present disclosure.

In further embodiments, the teachings herein may be adapted to heads having more than three modules.

Figure 7A:
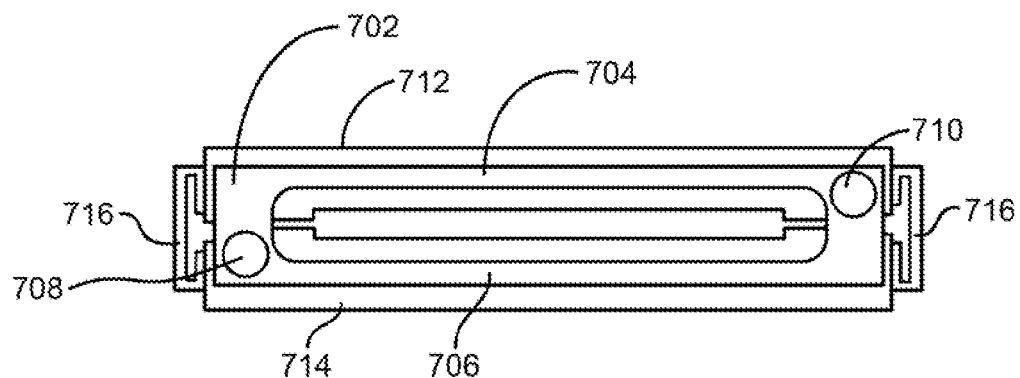
FIGS. 7A-7B are bottom and side views, respectively, of modules of a magnetic tape head according to one embodiment.
Figure 7B:
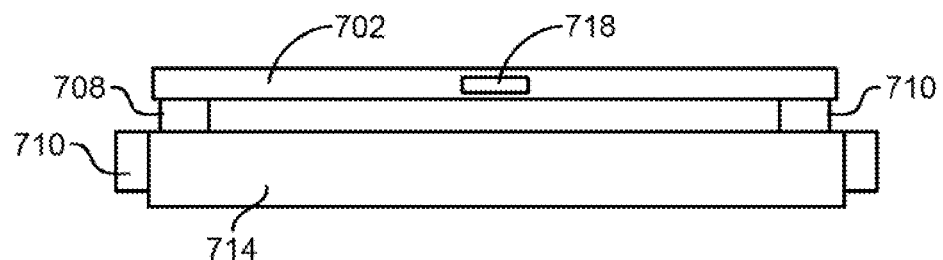

In one preferred embodiment, depicted in FIGS. 7A and 7B, the actuator 702 includes a hollow frame having at least two arms 704, 706 extending between points of coupling 708, 710 of the actuator to the modules 712, 714. The opening in the frame provides access to the center of the modules for attaching a cable. The springs 716 as depicted are "C" shaped pieces attached to the ends of the modules. Heating elements 718 may be placed on both arms of the frame, such that the two arms can be heated simultaneously and evenly. The actuator in this or any other embodiment can be heated with any number of different techniques, such as passing current through the beam directly, a heating element on the beam, wrapping the beam in current carrying wire, etc. In addition or alternatively, the beam may be cooled using any suitable technique or mechanism, including those listed above.

The effectiveness of this thermal actuator can be increased by selecting a design which minimizes the heat transferred to the modules. In such designs, attachment pins or adhesives may be comprised of a thermally insulating material. Likewise, a method of insulating the beam from the modules, through use of a thermally insulating material at the attachment points may be used in any of the other embodiments. The insulation minimizes heating of the modules and results in a maximal displacement for a given temperature.

Figure 8A:
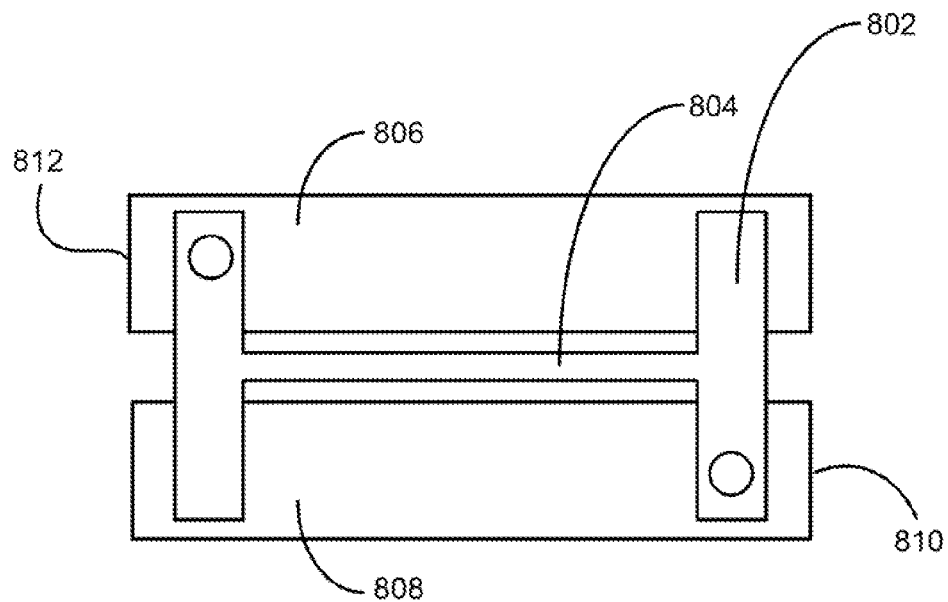
FIGS. 8A-8B are bottom and top views, respectively, of a magnetic tape head according to one embodiment.
Figure 8B:
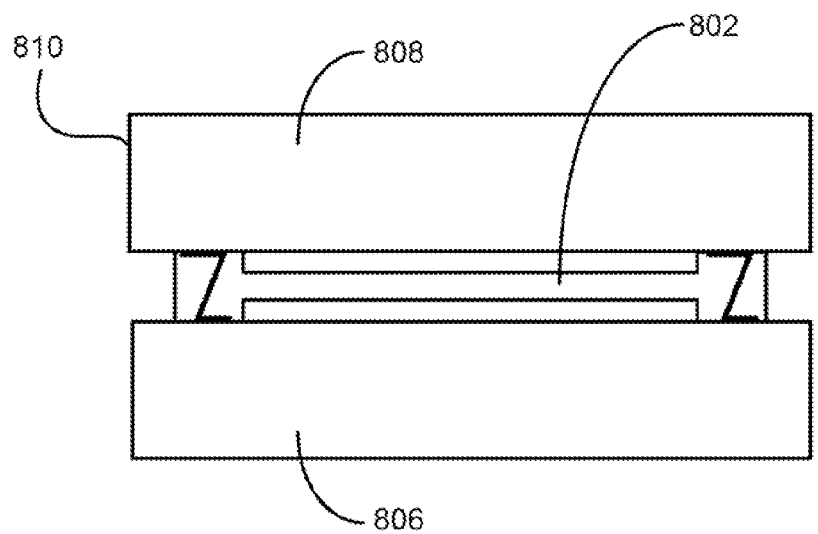

In yet another embodiment, depicted in FIGS. 8A and 8B, the actuator 802 is comprised of a beam 804 centered between the two modules 806, 808 leaving space for cables one either side of the beam. The ends of the beam are attached to a first end 810 of one of the modules and a second end 812 of the other module (e.g., anywhere in the end region at or near the end face of the respective module). The modules may also have a mechanism for coupling. In FIG. 8A, the coupling mechanism is behind the actuator and is not visible. In FIG. 8B, Z-shaped metal springs are placed between the modules.

Figure 9:
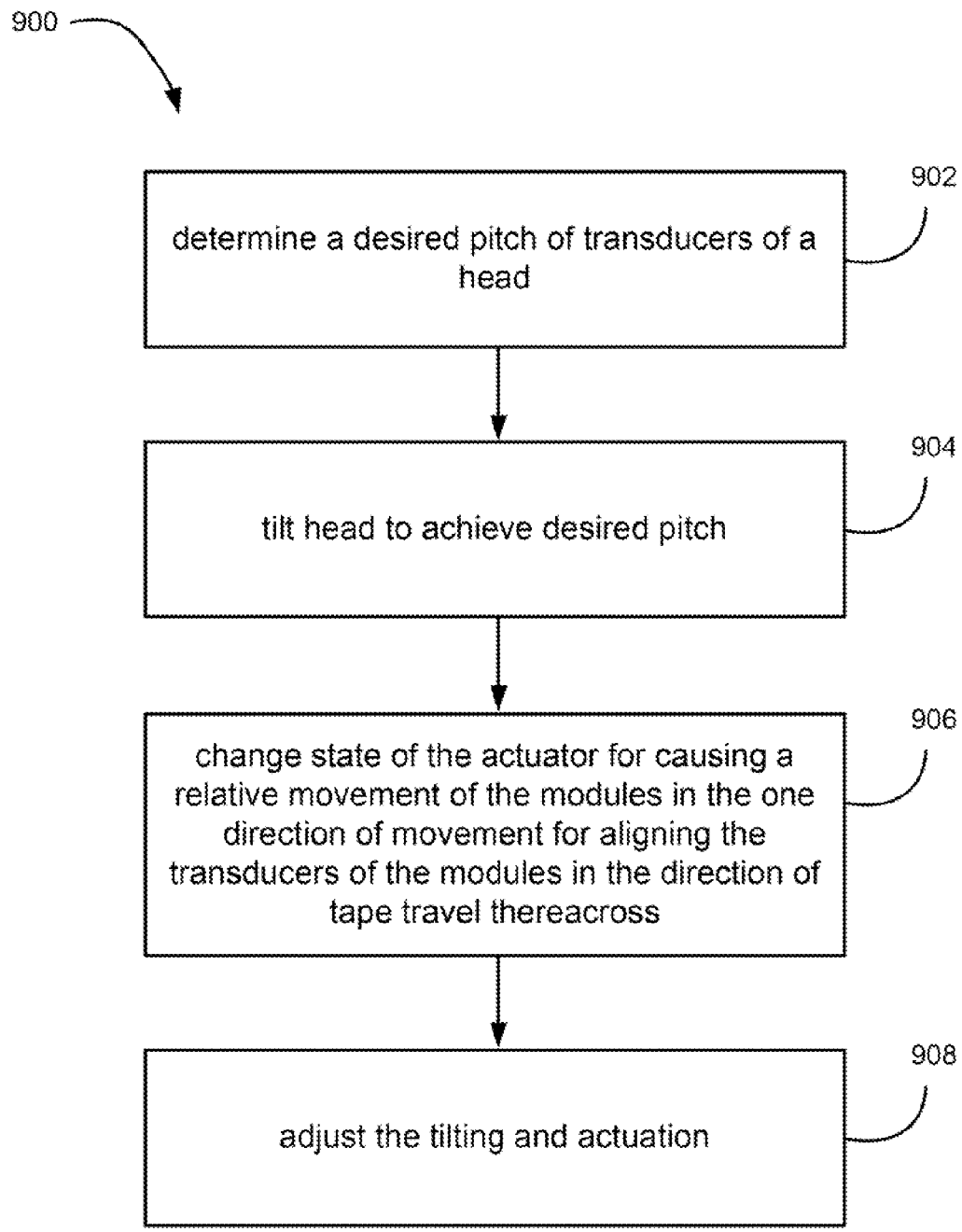
FIG. 9 is a process flow diagram according to one embodiment of the present invention.

FIG. 9 depicts a process 900 according to one embodiment. In operation 902, a desired pitch for the transducers is determined. Information previously written on the tape may be used to determine the proper transducer pitch. An exemplary mechanism for establishing the proper pitch is to use the timing interval read by two servo readers to determine the state of the tape, e.g., contracted, expanded or nominal. Although a preferred mode is to use servo data, this is not absolutely required.

In operation 904, the head is tilted to achieve the desired pitch, the head having opposing modules generally aligned with each other in a direction of tape travel thereacross, positions of the two modules being fixed relative to each other in every direction of movement except one, each module having an array of the transducers.

In another approach, steps 902 and 904 may be performed concurrently. For example, in one embodiment the proper transducer pitch may be based on data signals. One way to implement this is by first setting the transducer pitch at a nominal value by selecting a nominal tilt, and then adjusting the tilting thereof to obtain a better readback quality across the read channels. The quality may be determined for example by finding the lowest error rate, or best signal to noise level.

In operation 906, the state of the actuator is changed, e.g., by heating or cooling, application of a voltage thereto, etc., for causing a relative movement of the modules in the one direction of movement for aligning the transducers of the modules in the direction of tape travel thereacross. Operations 904 and 906 may be performed concurrently in some approaches, and in other approaches operations 902, 904, and 906 may all be performed concurrently. Moreover, the process for determining the extent of actuation may be similar to the process for determining the proper tilt. In another approach, a lookup table may be consulted for selecting an extent of actuation based on a corresponding tilt angle and formulas and/or further tables may be used to adjust for the ambient temperature within the drive or within the room.

In optional operation 908, the system may continue or periodically monitor the appropriate signals and adjust the tilting and actuation. Adjustments can be performed any time, such as during an initialization period prior to reading or writing user data, during readback or writing operations, etc.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An assembly comprising:
 a first module and a second module each having multiple transducers, wherein the first module is movable relative to the second module;
 a tape dimensional stability compensation mechanism for tilting the modules to control a transducer pitch presented to a tape; and
 an actuator adapted to exert a force on both modules for causing the relative movement of the first module with respect to the second module for aligning the transducers of the first module with the transducers of the second module in a direction of tape travel thereacross.

2. The assembly as recited in claim 1, wherein the first module is movable relative to the second module in only one direction of motion.

3. The assembly as recited in claim 2, wherein the one direction of movement is about perpendicular to a direction of tape travel thereacross.

4. The assembly as recited in claim 1, further comprising a controller configured to control the tape dimensional stability compensation mechanism and the actuator based on a readback signal of the tape.

5. The assembly as recited in claim 1, wherein the actuator includes a beam coupled to a first end of one of the modules and a second end of another of the modules, wherein changing a temperature of the beam causes the relative motion between the two modules.

6. The assembly as recited in claim 1, further comprising a spring connecting the modules.

7. The assembly as recited in claim 6, wherein the spring is Z-, C- or U-shaped.

8. The assembly as recited in claim 1, wherein the actuator is a piezoelectric actuator.

9. The assembly as recited in claim 1, further comprising a middle module positioned between the opposing modules, the actuator not being coupled to the middle module.

10. The assembly as recited in claim 1, further comprising a middle module positioned between the opposing modules, the actuator being coupled to the middle module.

11. The assembly as recited in claim 1, further comprising a third module positioned outside and aligned with the opposing modules, and a second actuator being coupled to one of the opposing modules and the third module.

12. The assembly as recited in claim 1, wherein the actuator is physically displaced from the modules.

13. The assembly as recited in claim 1, wherein the actuator has an I-shape.

14. The assembly as recited in claim 1, wherein the actuator has at least two arms extending between points of coupling of the actuator to the modules.

15. A data storage system, comprising:
a magnetic head having the modules and the actuator as recited in claim 1;
a drive mechanism for passing a magnetic medium over the magnetic head; and
a controller electrically coupled to the magnetic head.

16. A system, comprising:
opposing modules generally aligned with each other in a direction of tape travel thereacross, positions of the two modules being fixed relative to each other in every direction of movement except one, each module having multiple transducers arranged in an array; and
an actuator adapted to exert a force on both modules for causing a relative movement of the modules in the one direction of movement.

17. A data storage system, comprising:
a magnetic head having the modules and the actuator as recited in claim 16 and a tape dimensional stability compensation mechanism for tilting the modules to control a transducer pitch presented to a magnetic medium;
a drive mechanism for passing the magnetic medium over the magnetic head; and
a controller electrically coupled to the magnetic head.

18. A method, comprising:
determining a desired pitch for transducers for reading and/or writing to a magnetic tape;
tilting a head to achieve the desired pitch, the head having opposing modules generally aligned with each other in a direction of tape travel thereacross, positions of the two modules being fixed relative to each other in every direction of movement except one, each module having an array of the transducers; and
changing a state of an actuator for causing a relative movement of the modules in the one direction of movement for aligning the transducers of the modules in the direction of tape travel thereacross.

19. The method as recited in claim 18, wherein changing the state of the actuator includes changing a temperature of the actuator to induce thermal expansion or contraction thereof.

20. The method as recited in claim 18, further comprising determining a state of the tape, the desired pitch being determined based on the state of the tape.

* * * * *